(12) United States Patent
Finn

(10) Patent No.: US 11,250,305 B2
(45) Date of Patent: Feb. 15, 2022

(54) RFID ENABLED METAL TRANSACTION CARDS

(71) Applicant: Federal Card Services, LLC, Cincinnati, OH (US)

(72) Inventor: David Finn, Füssen Weissensee (DE)

(73) Assignee: Federal Card Services, LLC, Cincinnati, OH (US)

( * ) Notice: Subject to any disclaimer, the term of this patent is extended or adjusted under 35 U.S.C. 154(b) by 0 days.

(21) Appl. No.: 17/147,488

(22) Filed: Jan. 13, 2021

(65) Prior Publication Data
US 2021/0216838 A1    Jul. 15, 2021

Related U.S. Application Data

(60) Provisional application No. 63/080,034, filed on Sep. 18, 2020, provisional application No. 63/053,559, filed on Jul. 17, 2020, provisional application No. 63/040,544, filed on Jun. 18, 2020, provisional application No. 62/971,927, filed on Feb. 8, 2020, provisional application No. 62/969,034, filed on Feb. 1, 2020, provisional application No. 62/960,178, filed on Jan. 13, 2020.

(51) Int. Cl.
*G06K 19/06*    (2006.01)
*G06K 19/07*    (2006.01)
*G06K 19/077*    (2006.01)

(52) U.S. Cl.
CPC ... *G06K 19/06187* (2013.01); *G06K 19/0723* (2013.01); *G06K 19/07771* (2013.01)

(58) Field of Classification Search
CPC ........ G06K 19/00; G06K 19/04; G06K 19/06; G06K 19/08
USPC .................. 235/493, 492, 380, 487, 375
See application file for complete search history.

(56) References Cited

U.S. PATENT DOCUMENTS

2010/0230309 A1*  9/2010  Kiyozuka .......... G06K 19/0723
                                                                206/320
2019/0286961 A1*  9/2019  Lowe ................. G06K 19/0772

* cited by examiner

*Primary Examiner* — Edwyn Labaze
(74) *Attorney, Agent, or Firm* — Michael D. Eisenberg

(57) ABSTRACT

An RFID enabled metal transaction card comprising (i) a transponder chip module (TCM) having a RF payment chip (IC) and a module antenna (MA), (ii) a coupling frame (CF) in the form of a metal card body (MCB) having an electrical discontinuity comprising a slit (S, $S_{CF}$) and (iii) a discontinuous metal frame (DMF) assembled to the metal card body (MCB) in a peripheral area thereof and having a slit (S, $S_{DMF}$). The discontinuous metal frame (DMF) is electrically isolated from the metal card body (MCB) and may be coated with an insulating medium. The DMF camouflages the slit in the metal card body and mechanically stabilizes the structure of the card body, especially during insertion in an automatic teller machine (ATM) or point of sale (POS) terminal.

17 Claims, 6 Drawing Sheets metal card body (MCB) with slit discontinuous metal frame (DMF) having a slit

MCB & DMF

RFID ENABLED METAL TRANSACTION CARDS

CROSS REFERENCE TO RELATED APPLICATIONS

Priority (filing date benefit) is claimed from the following, incorporated by reference herein:
nonprovisional of 63/080,034 filed 18 Sep. 2020
nonprovisional of 63/053,559 filed 17 Jul. 2020
nonprovisional of 63/040,544 filed 18 Jun. 2020
nonprovisional of 62/971,927 filed 8 Feb. 2020
nonprovisional of 62/969,034 filed 1 Feb. 2020
nonprovisional of 62/960,178 filed 13 Jan. 2020

TECHNICAL FIELD

The disclosure may relate broadly to passive RFID enabled metal transaction cards including "metal smartcards" such as encapsulated metal smartcards, metal core smartcards (aka embedded metal or metal veneer smartcards—plastic front, edge to edge metal core, plastic back), metal face smartcards (aka metal hybrid cards—metal front, plastic back), full metal smartcards, and biometric metal smartcards, having an RFID chip (IC) or chip module (CM) capable of operating in a "contactless" mode (ISO 14443 or NFC/ISO 15693), including dual interface (DI) metal smartcards and metal payment objects (or "metal payment devices") which can also operate in "contact" mode (ISO 7816-2). Some of the disclosure(s) herein may relate to metal smartcards having only a contactless interface.

The disclosure(s) herein may further relate to biometric transaction cards and smartcards with a dynamic display.

BACKGROUND

Passive dual interface smartcards with a metal layer (ML) or metal card body (MCB) having a slit (S) and a module opening (MO) to accommodate a transponder chip module (TCM) (6 or 8 pin package) is known in the smartcard industry. The metal layer (ML) or metal card body (MCB) with a slit (S) extending from a perimeter edge to a module opening (MO), so as to function as a coupling frame (CF), requires that the module antenna (MA) of the transponder chip module (TCM) overlaps at least a portion of the metal within the area of the module opening (MO). In other words, the turns or windings of the module antenna (MA) on the face-down side or rear side of the transponder chip module (having contact pads on the face-up side) must overlap at very close range the metal layer in the module opening to enable contactless communication when the smartcard is in an electromagnetic field generated by a reader or point of sale terminal.

The transponder chip module (TCM) comprises a module antenna (MA) with a certain number of turns or windings electrically connected on the module tape (MT) to the antenna bonding pads $L_A$ and $L_B$ of the RFID chip. In a wearable payment device made of metal, according to the prior art, the transponder chip module does not have contact pads, and the module antenna overlaps the slit or discontinuity which begins at a perimeter edge of the metal and extends across the metal housing forming an integral part of the wearable device.

The integration of a booster antenna (BA), compensating loop (CL), discontinuous metal frame (DMF) and coupling frame (CF) in smartcards to amplify the RF signal for inductive coupling with the module antenna (MA) of a transponder chip module (TCM), as well as the alternative approach of physically connecting an in-card antenna to the connection pads on a chip module without a module antenna is well documented, and sets the stage for the next generation of contact and contactless transaction cards with multiple components and sensors.

The prior art is silent on a metal layer (ML) or metal card body (MCB) without slit (S) acting as a coupling frame (CF), to drive a transponder chip module (TCM). In all representations of the RFID slit technology, the transponder chip module comprises an RFID chip connected to a module antenna on the same substrate. In all disclosures of dual interface smartcards, the slit always extends from a perimeter edge to a module opening, without considering that the slit may not need to extend to the module opening in order to operate as a coupling frame. Distribution of surface currents from different locations on a metal card body is not acknowledged by the prior art, and that such locations could individually drive an electronic component.

The prior art does not consider the application of a flexible circuit (FC) to pick-up surface current from a discontinuity in a metal card body and to direct such current to an antenna structure, discrete component or any electronic device.

It is an object of the current invention to produce solid metal transaction cards without synthetic material sandwiching the metal or laminated to the metal, and that the metal transaction cards can operate in contact and contactless mode, with the capability to harvest and store energy from an electromagnetic field. It is a further object of the invention to integrate electronic components into the card body such as a fingerprint sensor, dynamic display, measurement sensor, switching element and camera.

Some Definitions

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Module Antenna (MA)

This is an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-up-side. The termination ends of the antenna structure (AS) with multiple windings (13 to 15 turns) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Coupling Loop Antenna (CLA)

This is antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

Coupling Frame Antenna (CFA)

A metal layer or metal card body with a discontinuity may be represented by card size planar antenna having a single turn, with the width of the antenna track significantly greater than the skin depth at the frequency of interest.

Sense Coil (SeC), Patch Antenna (PA) and Pick-Up Coil (PuC)

These are all types of coils or antennas used to capture surface current by means of inductive coupling at the edge of a metal layer (ML) or metal card body (MCB) or around a discontinuity in a metal layer (ML) or metal card body (MCB) when such conductive surfaces are exposed to an electromagnetic field. The coils or antennas may be wire wound, chemically etched or laser etched, and positioned at very close proximity to a discontinuity in a metal layer, at the interface between a conductive and non-conductive surface, or at the edge of a metal layer.

Antenna Cell (AC)

It is an antenna structure (AS) such as sense coil (SeC), patch antenna (PA) or pick-up coil (PuC) on a flexible circuit (FC) driving an electronic component such as a fingerprint sensor or a dynamic display. A plurality of antenna cells (ACs) at different locations in a metal transaction card may be used to power several electronic components.

Antenna Probe (AP)

A pick-up antenna in the form of a micro-metal strip (first electrode) may be placed in the middle of a discontinuity to probe eddy current signals from the magnetic flux interaction with the metal layer acting as the coupling frame. The metal layer also acts as the second electrode in the circuit. The metal strip may be replaced by a sense coil with a very fine antenna structure to pick-up the surface currents from within the discontinuity.

Coupling Loop Structure (CLS)

It is a flexible circuit (FC) with a sense Coil (SeC), patch antenna (PA) or pick-up coil (PuC) for inductive coupling with a discontinuity in a metal layer (coupling frame) to pick-up surface currents and to direct such currents via traces or tracks to an antenna having a frame or spiral shape on the flexible circuit (FC) which further inductively couples in close proximity with the module antenna (MA) of a transponder chip module (TCM).

Metal Edge & Metal Ledge

For optimum RF performance the dimensional width of the windings (or width across multiple windings) of a sense coil (SeC), patch antenna (PA) or a pick-up coil (PuC) ought to overlap a metal edge (ME) by 50% to capture the surface currents. The same applies to the module antenna (MA) of a transponder chip module (TCM) implanted in a metal containing transaction card. The dimensional width of the windings of the module antenna (MA) ought to overlap a metal ledge (P1) of a stepped cavity forming the module pocket in a card body by 50%. In the case of an antenna probe, surface currents are collected between very close metal edges. As the shape and form of the antennas may change, the dimensional width of the windings may be replaced by the surface area or volume.

SUMMARY

It is a general object of the invention to provide techniques for improving (i) coupling of an RFID enabled metal transaction card with a contactless reader; (ii) mechanical stability of the transaction card; (iii) the drop acoustics of the metal transaction card to retain the metal sound integrity; and the integration of electronic components therein.

According to the invention, generally, an RFID enabled metal transaction card comprising (i) a transponder chip module (TCM) having a RF payment chip (IC) and a module antenna (MA), (ii) a coupling frame (CF) in the form of a metal card body (MCB) having an electrical discontinuity comprising a slit (S, SCF) and (iii) a discontinuous metal frame (DMF) assembled to the metal card body (MCB) in a peripheral area thereof and having a slit (S, SDMF). The discontinuous metal frame (DMF) is electrically isolated from the metal card body (MCB) and may be coated with an insulating medium. The DMF camouflages the slit in the metal card body and mechanically stabilizes the structure of the card body, especially during insertion in an automatic teller machine (ATM) or point of sale (POS) terminal.

A metal ledge (ML) in the module opening (MO) of the coupling frame (CF) or metal card body (MCB) may overlap the antenna tracks of the module antenna (MA) of the transponder chip module (TCM).

Techniques for improving coupling between different components of a metal transaction card are provided, such as between an antenna probe (AP) integrated within the area of a slit (S) or gap (G) in a coupling frame (CF) for the purpose of collecting surface currents to power an electronic component such as a fingerprint sensor or a dynamic display.

Relaxing performance constraints on the coupling frame (CF) of a metal transaction card are discussed, including the possibility of eliminating the slit (S) altogether, especially in a transaction card comprising a metal substrate and a non-conductive substrate. The module antenna of a transponder chip module may overlap the interface of the two materials, namely at the junction between the conductive and non-conductive materials to pick-up the surface currents.

Multiple slits (S) or gaps (G) at different locations in a metal card body can be coupled to multiple sense coils to individually drive multiple components. Notably, the slit (S) or gap (G) may not need to extend to the module opening (MO) in order to operate as a coupling frame (CF).

The invention is also directed to metal transaction cards produced from metal inlays in sheet format or from an endless web of metal. The combination of laser cutting and CNC milling may be optimized to maximize the production throughput of RFID enabled metal transaction cards.

According to some embodiments (examples) of the invention, an RFID enabled metal transaction card may comprise: a transponder chip module (TCM) comprising an RFID chip (IC) and a module antenna (MA); and a coupling frame (CF) in the form of a metal card body (MCB) comprising a conductive surface and having an electrical discontinuity comprising a slit (S, SCF) extending through the surface from an outer edge thereof to an inner position thereof; and may be characterized by: a discontinuous metal frame (DMF) extending around a peripheral region of the card body with a slit (S, SDMF) disposed to camouflage the slit of the coupling frame and mechanically support the card body structure; and wherein there is not a booster antenna disposed in the card.

The discontinuous metal frame may be electrically isolated from the metal card body. The discontinuous metal frame may be electrically separated from the metal card body using ceramic material. The discontinuous metal frame may be coated with an insulating medium. The discontinuous metal frame may be disposed to be flush with, rise (protrude) above, or sink (be recessed) below a surface of the metal card body.

In an embodiment of the invention, the slit in a metal transaction card does not extend from a perimeter edge to a module opening resulting in a mechanical destabilization of the metal card body, and in some instances a slit is not required for contactless communication.

In another embodiment of the invention, a discontinuous metal frame (DMF) or compensating loop (CL) is mounted to a perimeter edge of a metal card body camouflaging an underlying slit or slits in the metal card body (MCB), providing mechanical support around the card insertion area, and enhancing the decorative design of the card. The metal material for the DMF or CL may differ to the metal used in the card body, and the metal of the DMF or CL may be coated to provide electrical insulation. The discontinuous metal frame or compensating loop is electrically isolated from the metal card body.

The discontinuous metal frame or compensating loop fits snuggly onto a stepped lip around the rim of the metal card body. The width of the lip may be approximately 8.5 mm with a depth of 300 µm. In other words, the discontinuous metal frame (DMF) or compensating loop (CL) fits onto the metal card body (MCB), with the metal card body being flush with, protruding over, or countersunk below the DMF or CL.

Some other objects may include providing techniques for improving coupling between different components of a metal transaction card, such as between an antenna probe (AP) integrated within the area of a slit (S) or gap (G) in a coupling frame (CF) for the purpose of collecting surface currents to power an electronic component such as a fingerprint sensor or a dynamic display.

Further objects may include relaxing performance constraints on the coupling frame (CF) of a metal transaction card, including the possibility of eliminating the slit (S) altogether, especially in a transaction card comprising a metal substrate and a non-conductive substrate. The module antenna (MA) of the transponder chip module (TCM) may overlap the interface of the two materials, namely at the junction between the conductive and non-conductive materials to pick-up the surface currents. Alternatively, a sense coil (SeC) on a flexible circuit (FC) may overlap the interface between the conductive and non-conductive materials for inductive coupling and to redirect the surface currents for purpose of driving an electronic component.

In a further embodiment of the invention multiple slits (S) or gaps (G) at different locations in a metal card body (MCB) can be coupled to multiple sense coils (SeC) to individually drive multiple components. Notably, the slit (S) or gap (G) may not need to extend to the module opening (MO) in order to operate as a coupling frame (CF).

The invention is also directed to metal transaction cards produced from metal inlays in sheet format or from an endless web of metal. The combination of laser cutting and CNC milling can be optimized to maximize the production throughput of RFID enabled metal transaction cards.

In their various embodiments, the invention(s) described herein may relate to industrial and commercial industries, such RFID applications, payment smartcards (metal, plastic or a combination thereof), electronic credentials, identity cards, loyalty cards, access control cards, wearable devices, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another.

Figure 1:
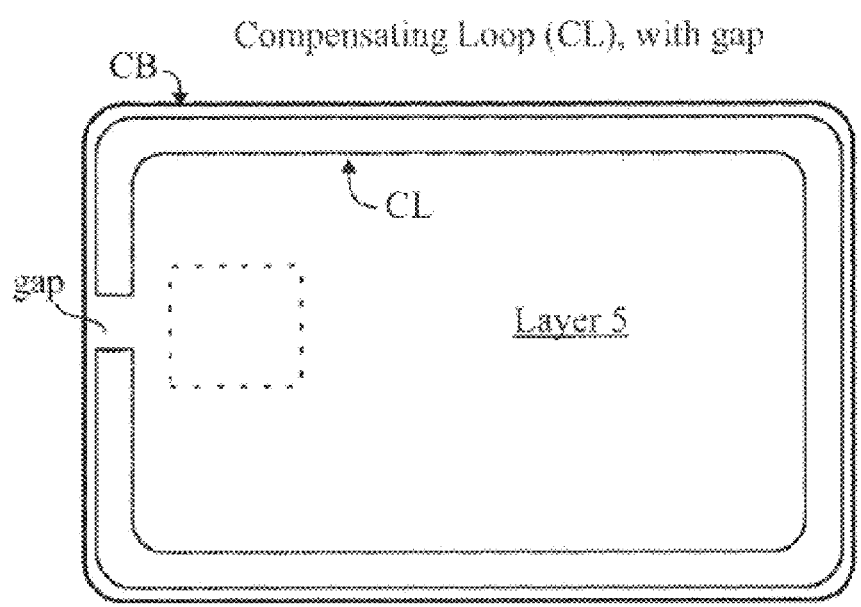

Any text (legends, notes, reference numerals and the like) appearing on the drawings are incorporated by reference herein.

Some elements may be referred to with letters ("AS", "CBR", "CF", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

FIG. 1 (compare FIG. 4A of US 2013/0126622) is diagram of a layer with a compensating loop having a gap, according to the prior art.

Figure 2A:
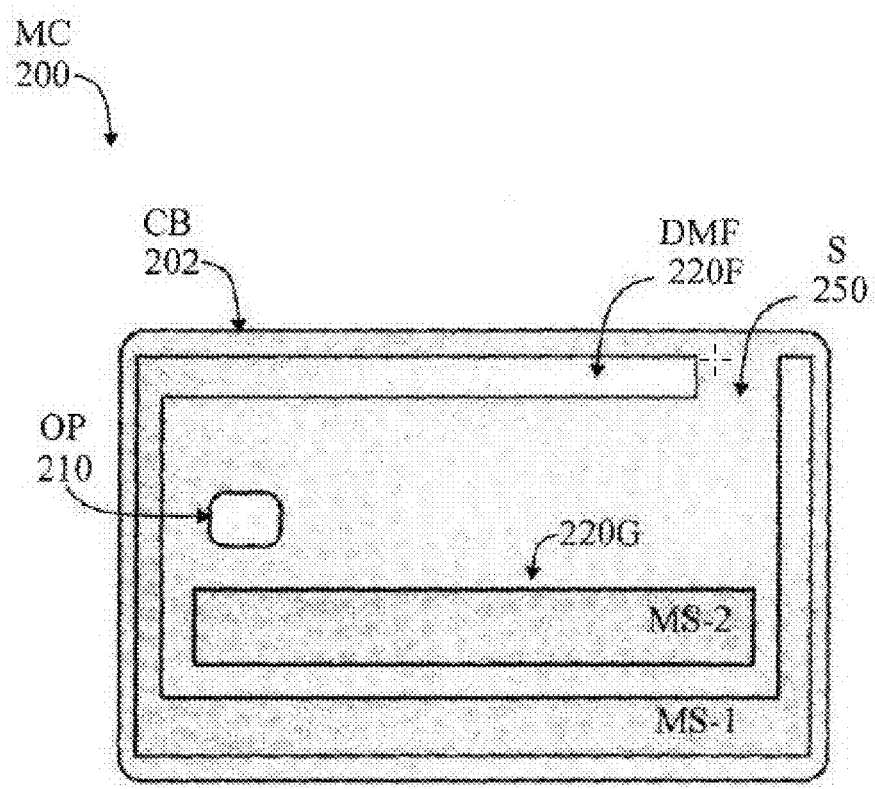
Figure 2B:
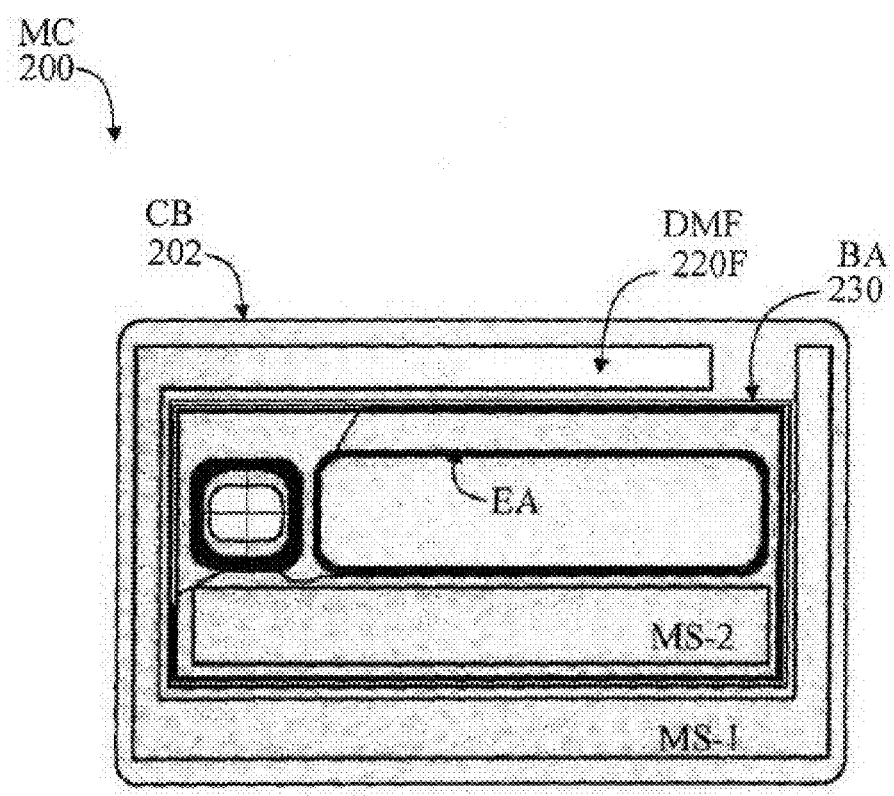

FIGS. 2A and 2B (compare FIG. 2H-1, -2, respectively, of US 2015/0269477) are two front views of a dual-interface metal hybrid smartcard with a discontinuous metal frame (DMF) around the perimeter of the card body and the booster antenna inside the free space of the metal frame, according to the prior art.

Figure 3:
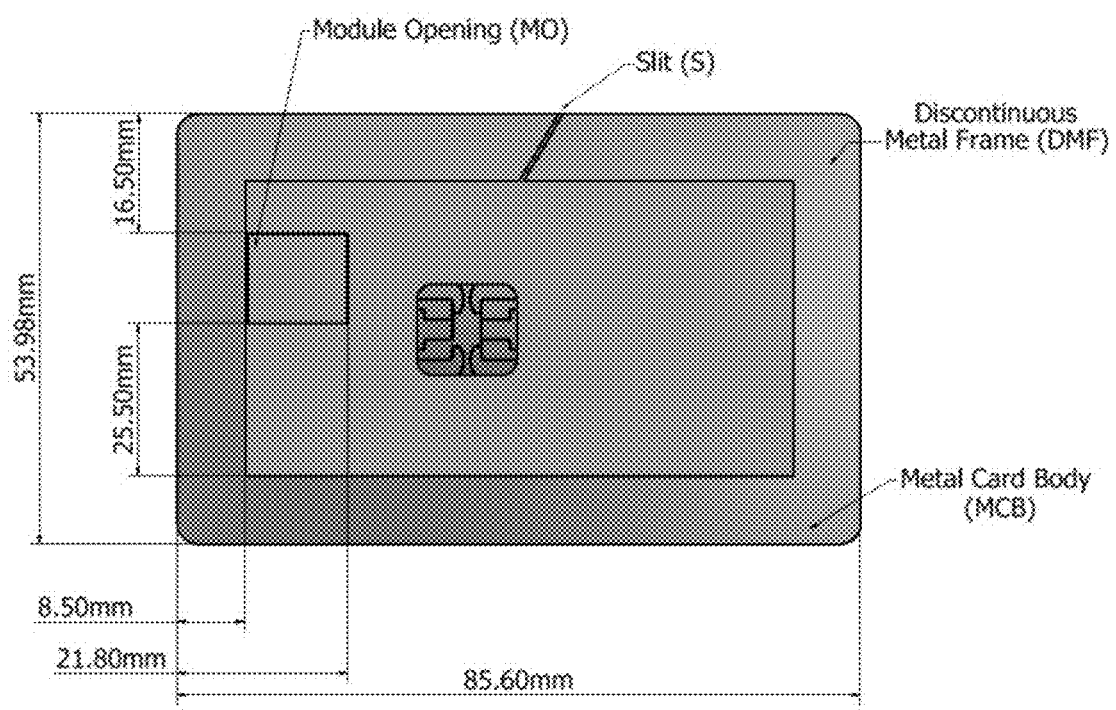

FIG. 3 is a diagrammatic view of a front surface of a metal transaction card having a discontinuous metal frame (DMF) with a slit (S) assembled around the perimeter edge of a metal card body (MCB), according to the invention.

Figure 4:
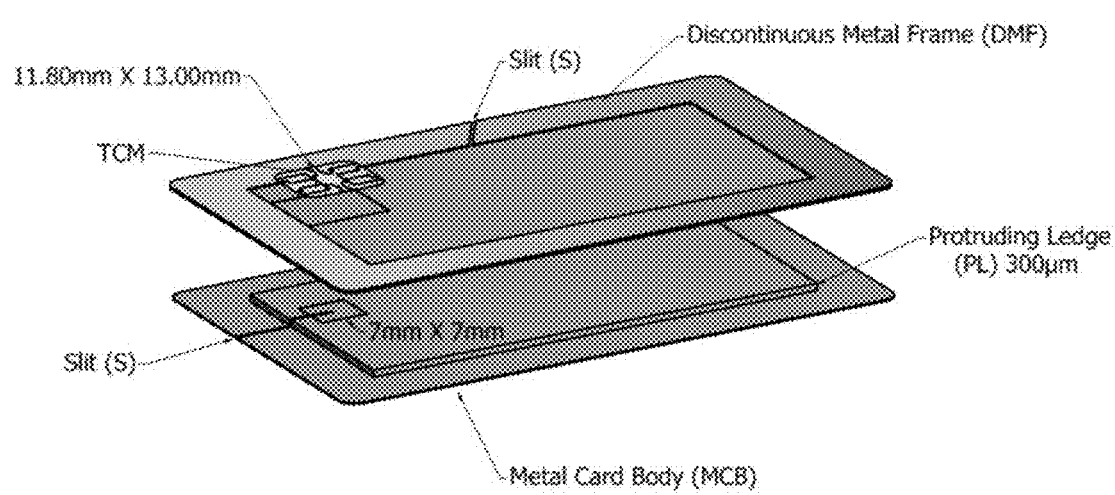

FIG. 4 is a perspective view (exploded) of a metal transaction card comprising a solid metal card body (MCB) with a discontinuous metal frame (DMF), according to the invention.

Figure 5A:
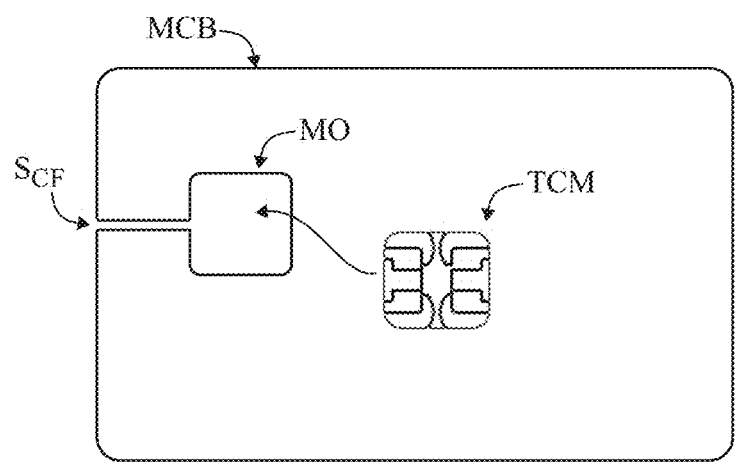

FIG. 5A is a diagram (plan view) of a smartcard (SC) comprising a metal card body (MCB) having a module opening (MO) for receiving a transponder chip module (TCM), and a slit (S, $S_{CF}$) extending from a periphery of the card body to the module opening, such as disclosed in U.S. Pat. No. 9,697,459.

Figure 5B:
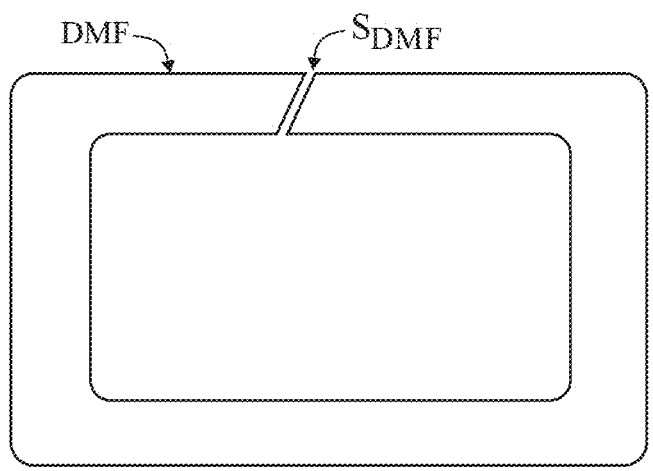

FIG. 5B is a diagram (plan view) of a discontinuous metal frame (DMF) having a slit (S, $S_{DMF}$), according to the invention.

Figure 5C:
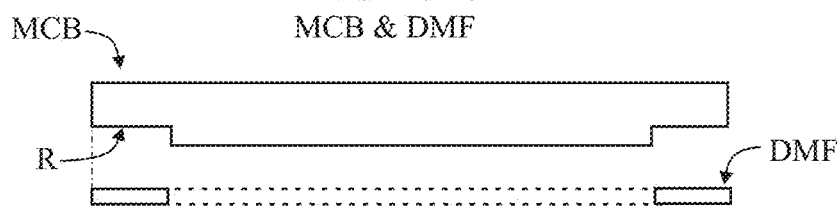

FIG. 5C is a diagram (cross-sectional view, exploded) showing the discontinuous metal frame (DMF) of FIG. 5B mounted in a recess (R) in a bottom surface of the metal card body (MCB) of FIG. 5A.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

Compensation Loop

US 2013/0126622 discloses a dual-interface smart card having a booster antenna with coupler coil in its card body, and a metalized face plate having a window opening for the antenna module. Performance may be improved by one or more of making the window opening substantially larger than the antenna module, providing perforations through the face plate, disposing ferrite material between the face plate and the booster antenna. Additionally, by one or more of modifying contact pads on the antenna module, disposing a compensating loop under the booster antenna, offsetting the antenna module with respect to the coupler coil, arranging the booster antenna as a quasi-dipole, providing the module antenna with capacitive stubs, and disposing a ferrite element in the antenna module between the module antenna and the contact pads.

FIG. 1 (compare FIG. 4A of 2013/0126622) shows that a conductive "compensation loop" CL may be disposed (such as in Layer 5, FIG. 2) behind the booster antenna BA (Layer 3), extending around the periphery of the card body CB. The compensation loop CL may be an open loop having two free ends, and a gap ("gap") therebetween. The compensation loop CL may be made of copper cladding, can be printed on a support layer, etc.

FIG. 4B (not shown) of US 2013/0126622 shows that the compensation loop CL may comprise ferrite material, in which case since ferrite is not an electrical conductor (in contrast with copper) the loop may be closed, having no gap and no free ends.

The compensation loop may be referred to as a "frame". The compensation frame on the reverse side of the booster antenna BA (FIG. 1 of US 2013/0126622) may help with the stabilization of the resonance frequency.

The compensation loop CL may be used in addition to the booster antenna BA. The booster antenna BA may be embedded into one side of an inlay substrate while the compensation frame may be inkjet printed or adhesively attached to the opposite side of the inlay substrate. The compensation loop CL can be mounted using a subtractive (etching away of material) or additive (depositing material) process.

Discontinuous Metal Frame (DMF)

US 2015/0269477 discloses a dual-interface metal hybrid smartcard comprising a plastic card body (CB); a metal slug (MS) disposed in the card body; and a booster antenna (BA) disposed in the card body. The dual-interface metal hybrid smartcard may comprise: a card body (CB); and an "open loop" metal frame (DMF) disposed around a peripheral area of the card body; and a booster antenna (BA) disposed inside the an internal area of the metal frame. The "open loop" metal frame may comprise a slit (S). FIG. 2H therein is (two) front views labeled "(1)" and "(2)" of a dual-interface metal hybrid smartcard with a discontinuous metal frame (DMF) around the perimeter of the card body and the booster antenna inside the free space of the metal frame.

FIG. 2A herein (compare FIG. 2H-1 of US 2015/0269477) shows a metal hybrid dual-interface smartcard (MC) 200 with a metal slug component (MS-1) 220F (contrast 220D) which forms an "open loop" discontinuous metal frame (DMF) extending substantially fully, but not completely, around the perimeter of the card body (CB), with the booster antenna (BA) disposed inside the free space of the metal frame. There is a gap (G) or slit (S) 250 in the frame (MS-1), extending from an inner edge of the frame to an outer edge thereof, so it is not a "closed loop". Insulating layers (not shown), such as dielectric material or a layer of plastic may be disposed on at least one side of the metal frame, covering or filling the slit, and may comprise a dielectric medium such as an oxide layer. The frame may be covered on at least one side thereof with a layer of plastic over (and/or under) the slit (S). The slit (S) is shown at a corner of the frame (MS-1), but may be located at any suitable position along the extent of the frame, extending from an inner edge of the frame to the outer edge thereof. (See, for example, FIG. 4A of US 2015/0269477) where a slit extends from an opening in (or inner edge of) a slug to the outer edge thereof, at the "9 o'clock" position. The slit may extend across a side of the frame, a corner of the frame, etc. There may also be two slits, separating the frame into two pieces.

A second metal slug component (MS-2) 220G (compare 220E) may be disposed internal to the booster antenna (BA), in a manner similar to the second metal slug component (MS-2) of FIG. 2G. The two metal slug components (MS-1, MS-2) are disposed at positions in the card body in which the various antenna components of the booster antenna (BA) are not present. View (1) is a front view of the metal slug components (MS-1, MS-2) disposed in the card body (CB), without the booster antenna (BA) in place, for illustrative clarity.

FIG. 2B herein (compare FIG. 2H-2 of US 2015/0269477), or view (2), is a front view of the metal slug components (MS-1, MS-2) disposed in the card body (CB), with the booster antenna (BA) in place, showing that the metal slug components (MS-1, MS-2) may be have shapes and be disposed at locations in the card body (CB) to allow for installing a booster antenna in areas of the card body (CB) not occupied by the metal slugs (MS-1, MS-2).

FIG. 3 is a diagrammatic view of a front surface of a metal transaction card having a discontinuous metal frame (DMF) with a slit (S, or $S_{DMF}$) assembled around the perimeter edge of a metal card body (MCB). The metal card body (MCB) is formed as a coupling frame (CF) having a slit (S, or $S_{CF}$) extending from a peripheral edge thereof to, or nearly to, a module opening (MO) for receiving a transponder chip module (TCM). The module opening (MO) is disposed near the left edge of the card body (CB, MCB), per ISO 7816. The slit (S) may be located in a peripheral region of the card body (CB, MCB), between the module opening (MO) and the left edge of the card body (CB, MCB).

The discontinuous metal frame (DMF) is disposed in the peripheral region of the card body (CB, MCB) so as to conceal the slit (S) in the metal card body (MCB, CF). The slit ($S_{DMF}$) in the discontinuous metal frame (DMF) may be located at a different position around the periphery of the card body (CB, MCB) than the slit ($S_{CF}$) in the card body (CB, MCB, CF).

In contrast with (for example) the aforementioned US 2013/0126622 (see FIG. 1), although the discontinuous metal frame (DMF) described in FIG. 3 may resemble the compensating loop (CL) disclosed therein, it should be noted that the compensating loop functions in conjunction with a booster antenna (BA). There is no booster antenna in the smart card with discontinuous metal frame (DMF) and metal card body (MCB) coupling frame (CF) disclosed herein.

In contrast with (for example) the aforementioned US 2015/0269477 (see FIGS. 2A/B), although the discontinuous metal frame (DMF) described in FIG. 3 may resemble the discontinuous metal frame (DMF) disclosed therein, it should be noted that the DMF of '477 functions in conjunction with a booster antenna. (FIG. 2H is (two) front views labeled "(1)" and "(2)" of a dual-interface metal hybrid smartcard with a discontinuous metal frame (DMF) around the perimeter of the card body and the booster antenna inside the free space of the metal frame.) Also, there are no metal slugs in the discontinuous metal frame (DMF) described in FIG. 3. The card body (CB) is a metal card body (MCB).

The discontinuous metal frame (DMF) disclosed herein operates in conjunction with a metal card body (not present in either of US 2013/0126622 or US 2015/0269477) having a slit so as to function as a coupling frame. As a general proposition, a coupling frame negates the need for a booster antenna to "amplify" the signals coming to and from the chip module in the card.

The discontinuous metal frame (DMF) may be approximately 8.5 mm in width and may have a thickness of 300 μm. The discontinuous metal frame (DMF) may be made of any suitable metal and may be coated with an insulating medium, such as a diamond like carbon coating. The discontinuous metal frame (DMF) may electrically isolated from the metal card body (MCB, CF) so that it does not short out the slit ($S_{CF}$) in the metal card body (MCB, CF).

FIG. 4 is a perspective view (exploded) of a metal transaction card comprising (i) a solid metal card body (MCB) with a slit (S, $S_{CF}$) and (ii) a discontinuous metal frame (DMF) with a slit (S, $S_{DMF}$). A cavity or module opening is shown to accept an 8-pin transponder chip module (11.8 mm×13.00 mm) with its mold mass extending into the metal card body (MCB) having a recess or opening to match the dimensions of the mold mass (7 mm×7 mm). The metal card body (MCB) has a ledge (~460 μm) around its perimeter edge to support the discontinuous metal frame (DMF) with a thickness of 300 μm and a width of approximately 8.5 mm Therefore, the front surface of the metal card body (MCB) may be flush with the discontinuous metal frame (DMF) or may protrude over the discontinuous metal frame (DMF), or sink below the discontinuous metal frame (DMF).

The metal card body (MCB) may also have ceramic inserts for aesthetic purposes or for electrical separation of the metals. The ceramic material may be alumina oxide (Al2O3), zirconia oxide (ZrO2), silicon carbide (SiC) or silicon nitride (Si3N4).

FIG. 5A is a diagram (plan view) of a smartcard (SC) comprising a metal card body (MCB) having a module opening (MO) for receiving a transponder chip module (TCM), and a slit (S, $S_{CF}$) extending from a periphery of the card body to the module opening, such as disclosed in U.S. Pat. No. 9,697,459. The card conforms with ISO-7816. The slit (S, $S_{CF}$) is located on the left side of the card. The slit may extend partially to the module opening.

FIG. 5B is a diagram (plan view) of a discontinuous metal frame (DMF) having a slit (S, $S_{DMF}$). The metal frame is sized to extend around a peripheral are of the metal card body of FIG. 5A, with its slit (S, $S_{DMF}$) oriented on a top side of the card so as to be at a different peripheral position than the slit (S, $S_{CF}$) in the card body.

The discontinuous metal frame (DMF) may be mounted to the metal card body (MCB), and may have the same overall (outer) size as the metal card body (MCB)—as defined by ISO-7816. Since the slit (S, $S_{DMF}$) in the discontinuous metal frame (DMF) is offset (located at a different peripheral position of the card body) from the slit (S, $S_{CF}$) in the metal card body (MCB), the discontinuous metal frame (DMF) may reinforce the otherwise weak portion of the metal card body (MCB) caused by the slit (S, $S_u$) in the card body.

The discontinuous metal frame (DMF) may be electrically insulated from the metal card body (MCB) by coatings on either one or both of the discontinuous metal frame (DMF) and the metal card body (MCB), or by an insulating layer disposed between the discontinuous metal frame (DMF) and the metal card body (MCB), so that the discontinuous metal frame (DMF) does not short out the slit (S, $S_{CF}$) in the metal card body (MCB).

The discontinuous metal frame (DMF) may be mounted to a top or bottom surface of the metal card body (MCB). And, a recess may be formed in a surface of the metal card body (MCB) to receive the discontinuous metal frame (DMF) to be flush with the surface of the metal card body (MCB).

FIG. 5C is a diagram (cross-sectional view, exploded) showing the discontinuous metal frame (DMF) of FIG. 5B mounted in a recess (R) in a bottom surface of the metal card body (MCB) of FIG. 5A. Other (alternate) configurations are contemplated as being within the scope of the invention.

The recess (R) in the bottom surface of the metal card body (MCB) may be sized to accept the discontinuous metal frame (DMF) inserted therein in a "seamless" manner, and so that the bottom surface of the discontinuous metal frame (DMF) becomes substantially coplanar with the bottom surface of the metal card body (MCB). The discontinuous metal frame may be disposed to be flush with, rise (protrude) above, or sunk (be recessed) below the bottom surface of the metal card body. Alternatively If the recess (R) is in the top surface of the metal card body, the discontinuous metal frame may be disposed to be flush with, rise (protrude) above, or sunk (be recessed) below the top surface of the metal card body.

An insulating layer (not shown) may be disposed between the top surface of the discontinuous metal frame (DMF) and the bottom surface of the metal card body (MCB), namely in the recess (R). Alternatively, or additionally:
- the discontinuous metal frame may be electrically isolated from the metal card body.
- the discontinuous metal frame may be electrically separated from the metal card body using ceramic material (not shown).
- the discontinuous metal frame and/or the metal card body may be coated with an insulating medium, such as DLC (not shown) to render the coated surface of the discontinuous metal frame and/or the metal card body electrically nonconductive.

U.S. Pat. No. 9,697,459

U.S. Pat. No. 9,697,459 discloses RFID devices comprising (i) a transponder chip module (TCM, 1410) having an RFIC chip (IC) and a module antenna (MA), and (ii) a coupling frame (CF) having an electrical discontinuity comprising a slit (S) or non-conductive stripe (NCS). The coupling frame may be disposed closely adjacent the transponder chip module so that the slit overlaps the module antenna. More particularly, as disclosed therein:

FIG. 2B is a diagram (partial perspective view) illustrating smart card having a metal card body modified to function as a coupling frame.

FIG. 3A is a diagrammatic view of a front surface of a smart card (SC) which may be a metal card or composite metal card having a slit(S) to function as a coupling frame (CF).

FIG. 9 is a diagram (plan view, exploded) showing two coupling frames (CF-1, CF-2) each having two ends, and illustrates alternative ways of connecting the ends of one coupling frame to the ends of the other coupling frame.

FIG. 9A is a perspective view (exploded) of a construction of a card body of a smart card.

As further disclosed therein:

FIG. 2B illustrates a transponder chip module (TCM) 210 disposed in the card body (CB) 202 of a metal smartcard (SC) 200, or metal card (MC), wherein substantially the entire card body (e.g., 760 µm thick) comprises metal, and may be referred to as a metal card body (MCB). The transponder chip module (TCM) may reside in an opening (MO) 208 extending completely through the card body, The opening may be stepped, having a larger area portion and smaller area portion, as shown. This may result in a void 203 behind the transponder chip module (TCM), and the void may be filled with non-conductive filler 204. In a conventional metal smart card (not having a slit to function as a coupling frame), the void behind the transponder chip module may allow electromagnetic radiation from an external reader to interact with the transponder chip module.

A slit (S) 230 extends from an outer edge of the metal card body (MCB) to the opening (MO) and may overlap (underneath, as viewed) an outer portion of the module antenna (MA) 212 which may be a laser-etched antenna structure (LES). Similarly, a slit may be provided through a metal layer of a hybrid smart card. The slit (S) modifies the metal card body (MCB) or layer, allowing it to operate as a coupling frame 220 to enhance contactless communication with the transponder chip module.

FIG. 3A illustrates the front side of a smartcard (SC) 300 which may be a metal card having a metal layer (ML), which may constitute substantially the entire thickness of the card body (CB) 302. The card body (CB) may have a module opening (MO) 308 wherein a transponder chip module (TCM) 310 may be disposed, and a slit (S) 330 extending from the module opening (MO) to the outer perimeter of the metal layer (ML) so that the metal card body (MCB) 302 may function as a coupling frame (CF) 320. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM).

The slit (S) may overlap at least a portion of the module antenna (MA, not shown) of the transponder chip module. In some examples and embodiments of coupling frames incorporated into RFID devices disclosed herein, there may not need to be an opening (MO) in the coupling frame (CF) for the transponder chip module (TCM).

This concept of modifying a metal element to have a slit (S) to function as a coupling frame (CF) may be applied to other products which may have an antenna module (AM) or transponder chip module (TCM) integrated therewith, such as watches, wearable devices, and the like.

The slit (S) may extend completely (fully) through the metal layer (ML) forming the coupling frame (CF). The slit (S) may extend only partially through the metal layer, and remaining material of the metal layer below the slit (S) may have a thickness below a transparency threshold or skin depth for the metal layer. The slit (S) may have a width which is smaller than the opening. The slit (S) may be at least partially filled with an electrically non-conducting material selected from the group consisting of polymer and epoxy resin, reinforced epoxy resin. A reinforcing structure (RS) may be disposed at a location of the slit (S) to reinforce the metal layer (ML).

FIG. 9 is an exploded perspective view showing a first coupling frame (CF-1) 920A having two opposing end portions A & C separated by a slit (S1) 930A and a second coupling frame (CF-2) 920B having two opposing end portions B & D separated by a slit (S2) 930B.

FIG. 9A shows a card body construction for a smart card (SC). Typically, a metal card body would have an opening on the rear (back side) of the card body to allow contactless communication with a transponder chip module inside of the metal card. (The back side opening may also accommodate the size of the mold mass on the transponder chip module.) A dual-interface module would have contact pads on the front side, also blocking contactless communication with the chip module.

In this construction, there is a conventional recess (opening) extending into the front side of the card to accommodate a dual-interface transponder chip module (TCM), with its the contact pads exposed. The card body construction may be layered, as follows:
- a first (top) metal layer, having a thickness of approximately 300 µm, and having an opening for receiving the transponder chip module and a slit 930A extending from the opening to an outer edge of the layer, so that the layer may function as a coupling frame 920A. The slit may extend entirely across no-man's land, and its width may be approximately equal to the width (or transverse height) of no-man's land;
- a layer of adhesive, having a thickness of approximately 20 µm;
- a second (middle) metal layer having a thickness of approximately 100 µm. The second metal layer may have an opening for the mold mass of the transponder chip module and a slit 930B extending from the opening to an outer edge of the layer, so that the layer may function as a coupling frame 930B. The module antenna of the chip module may reside on this layer, so that the slit overlaps the module antenna outside of the opening.
- a layer of adhesive, having a thickness of approximately 20 µm;
- a third (bottom) metal having a thickness of approximately 320 µm. The third metal layer may have a slit 930C extending from an interior position of the layer to the outer edge of the layer so that the layer may function as a coupling frame 920C. This layer does not need an opening for the chip module or mold mass. The slit overlaps (underlies) the module antenna.

Alternatively, this card body construction could be produced having only two layers of metal or even one layer of metal. The layers can be separated electrically by an adhesive or the layers can be welded together to form a homogenous conductive layer.

Generally, the two or three coupling frames shown in FIGS. 9, 9A of U.S. Pat. No. 9,697,459 are each the full size of the card. These two coupling frames may be stacked one atop the other, with insulation therebetween. This is distinguishable from a metal card body, such as is shown in FIG. 2B or FIG. 3.

In contrast with the prior art described herein, the present invention is directed to an RFID enabled metal transaction card comprising:
- a transponder chip module (TCM) comprising an RFID chip (IC) and a module antenna (MA); and
- a coupling frame (CF) in the form of a metal card body (MCB) comprising a conductive surface and having an electrical discontinuity comprising a slit (S, SCF) extending through the surface from an outer edge thereof to an inner position thereof;

characterized by:
- a discontinuous metal frame (DMF) extending around a peripheral region of the metal card body with a slit (S, SDMF) disposed to camouflage the slit of the coupling frame and mechanically support the metal card body structure.

Further distinguishing characteristics may be evident from a comparison of the present invention, in its various forms, with the teachings of the prior art.

Improvements to RFID Slit Technology

The current invention makes use of the surface eddy currents which flow along the perimeter edge of a conductive surface such as a metal layer (ML) or metal card body (MCB) which has been exposed to electromagnetic waves, generated by a contactless reader or point of sale terminal. The intensity of such eddy currents at the frequency of interest is a maximum along the skin depth of the metal at its perimeter edge. The skin depth of copper, for example, at 13.56 MHz is approximately 18 µm.

The distance in which a slit (S), gap (G) or notch (N) needs to extend from the perimeter edge across the metal layer (ML) or metal card body (MCB), concentrating the surface current density, needs to be a substantial multiple of the skin depth distance to facilitate the diversion of current. Notably, the slit (S), gap (G) or notch (N) passes entirely through the metal layer (ML, MCB). The shape of the slit or notch can be straight, curved, u-shaped or have the form of a musical instrument such as a saxophone, signature (clef) or the name of a payment scheme.

A slit (S) in a metal layer (ML) or metal card body (MCB) to function as a coupling frame (CF) may extend from a perimeter edge to an opening (MO) in the layer or card body. The opening (MO) may be regarded as an extension of the slit (S), allowing the surface current to be directed and to flow around the inner edges of the opening. In the case of a metal layer (ML) or metal card body (MCB) without an opening, the surface current may be directed in another manner to the transponder chip module (TCM), by physically connecting a flexible circuit (FC) or flex-tape to termination points (TP) on each side of the slit (S).

Such metal transaction cards may comprise (i) a metal card body (MCB) with a slit (S) acting as a coupling frame (CF) having termination points (TP) on each side of the slit (S), (ii) a coupling loop antenna (CLA) with two end portions tightly coupled to a module antenna (MA) connected to an RFID chip in a transponder chip module (TCM) and (iii) the end portions of the coupling loop antenna (CLA) are electrically connected to the termination points (TP) on each side of the slit (S) of the coupling frame (CF).

U.S. Pat. No. 9,836,684

FIG. 3 of U.S. Pat. No. 9,836,684 is a diagrammatic view of a front surface of a smartcard (SC) according to the Prior Art which may be a metal card, composite metal card or encapsulated metal card having a slit(S) to function as a coupling frame (CF).

FIG. 3 of U.S. Pat. No. 9,836,684 illustrates the front side of a smartcard (SC) 300 which may be a metal card having a metal layer (ML), which may constitute substantially the entire thickness of the card body (CB) 102. The card body (CB) may have a module opening (MO) 108 wherein a transponder chip module (TCM) 110 may be disposed, and a slit (S) 130 extending from the module opening (MO) to the outer perimeter of the metal layer (ML) so that the metal card body (MCB) 102 may function as a coupling frame (CF) 120. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM). The slit (S) may overlap a portion of the module antenna (MA) 112 of the transponder chip module (TCM).

From the teachings of '684, it is apparent that the slit (S) extends from a perimeter edge of the metal card body (MCB) to a module opening (MO) to accept a transponder chip module (TCM), whereby the slit may overlap a portion of the module antenna (MA) of the transponder chip module (TCM).

Diamond Like Carbon or Plasma Vapor Deposition Coating of Metal (Prior Art)

A metal card body (or a layer thereof) can be made from aluminum and may be directly colored by an anodizing procedure, or a layer of stainless steel or titanium can be colored black with a layer of diamond like carbon (DLC) or black ceramic coating.

Should a metal layer or metal card body be highly polished prior to coating, the DLC will result in a gloss finish. To conceal a slit in a metal layer or metal card body (such as in stainless steel or titanium), the metal may be sand blasted (or glass bead blasted), such as before a DLC or PVD (plasma vapor deposition) coating, and the finish may turn out to be matte (not glossy) so that the slit is nearly impossible to see. Alternatively, the metal can be prepared with a brushed effect, equally resulting in a matt finish and concealing the presence of the slit.

Non-Conductive Coatings (Prior Art)

Coated metal cards with a nano-layer of diamond-like-carbon or titanium nitride (or any oxide layer) making the surface area non-conductive impairing the effects of electrostatic discharge (ESD) may have a defined area in which the bearer of the card can touch on each side (both, opposite sides) of the card body to effectuate a measurement or to switch-on a light source. Because of the layered construction, the perimeter edges of the metal card may also be used to short-circuit an electronic circuit by merely touching the exposed conductive metal edges.

Brushed Metal Effect to Hide a Slit

Brushed or dull polished metal is metal with a unidirectional satin finish. It is produced by polishing the metal with a 120-180 grit belt or wheel then softening with an 80-120 grit greaseless compound or a medium non-woven abrasive belt or pad. The intensity of the brushed finish is specified as a surface roughness and is typically 0.5-1.5 micrometers Ra. The brushed effect can be used to camouflage the presence of a slit in a metal card body.

Camouflaging a Slit in a Discontinuous Metal Frame (DMF)

To fill and disguise a slit or gap in a an "open loop" metal frame (DMF) or any metal layer such as a coupling frame with a slit or gap, a sacrificial layer (e.g. masking film or a surface protection layer which adheres to metal and post processing can be easily removed) is applied to one side of the metal frame or layer covering its entire surface. An ink, varnish or resin with or without a catalyst is applied to the exposed metal surface to fill the slit at each card body site in an inlay format, typically an array of 25-up.

The ink, varnish or resin is left to cure by UV irradiation or in an oven. In the cured state, the ink, varnish or resin retains its flexibility. The sacrificial layer is then removed from the metal, and ink/primer is applied to the now exposed side of the metal frame or layer. After printing the ink/primer to the surface of the metal frame or layer after removal of the sacrificial layer, a protective hard coat (ink, varnish, enamel or a polymer) which may be laser reactive for personalization is also applied. This (disguising the slit in a discontinuous metal frame or metal layer) may be applicable to some of the other embodiments disclosed herein, whether or not explicitly disclosed.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. An RFID enabled metal transaction card comprising:
   a transponder chip module (TCM) comprising an RFID chip (IC) and a module antenna (MA); and
   a coupling frame (CF) in the form of a metal card body (MCB) comprising a conductive surface and having an electrical discontinuity comprising a slit (S, $S_{CF}$) extending through the surface from an outer edge thereof to an inner position thereof;
   characterized by:
   a discontinuous metal frame (DMF) extending around a peripheral region of the card body with a slit (S, $S_{DMF}$) disposed to camouflage the slit of the coupling frame and mechanically support the card body structure;
   wherein there is not a booster antenna disposed in the card; and
   wherein the metal card body and the discontinuous metal frame both have overall dimensions conforming with ISO-7816.

2. The RFID enabled metal transaction card of claim 1, wherein:
   the discontinuous metal frame is electrically isolated from the metal card body.

3. The RFID enabled metal transaction card of claim 2, wherein:
   the discontinuous metal frame is electrically separated from the metal card body using ceramic material.

4. The RFID enabled metal transaction card of claim 2, wherein:
   the discontinuous metal frame is coated with an insulating medium.

5. The RFID enabled metal transaction card of claim 1, wherein:
   the discontinuous metal frame is disposed to be flush with, rise (protrude) above, or sink (be recessed) below a surface of the metal card body.

6. A metal transaction card comprising:
- a solid metal card body (MCB) with a slit (S, SCF) having a recess or opening;
- a discontinuous metal frame (DMF) with a slit (S, SDMF);
- a cavity or module opening; and
- a transponder chip module (TCM) disposed in the cavity or module opening;
- wherein the discontinuous metal frame (DMF) is supported around a perimeter of the metal card body (MCB).

7. The metal transaction card of claim 6, wherein:
the metal card body (MCB) has a ledge around its perimeter edge to support the discontinuous metal frame (DMF).

8. The metal transaction card of claim 6, wherein:
a front surface of the metal card body (MCB) is flush with the discontinuous metal frame (DMF).

9. The metal transaction card of claim 6, wherein:
a front surface of the metal card body (MCB) protrudes over the discontinuous metal frame (DMF).

10. The metal transaction card of claim 6, wherein:
a front surface of the metal card body (MCB) sinks below the discontinuous metal frame (DMF).

11. The metal transaction card of claim 6, further comprising:
inserts of a ceramic material selected from the group consisting of alumina oxide (Al2O3), zirconia oxide (ZrO2), silicon carbide (SiC), and silicon nitride (Si3N4).

12. The metal transaction card of claim 6, wherein:
the card conforms with ISO-7816.

13. The metal transaction card of claim 6, wherein:
the discontinuous metal frame (DMF) is sized to extend around a peripheral are of the metal card body (MCB) with its slit (S, SDMF) oriented on a top side of the card so as to be at a different peripheral position than the slit (S, SCF) in the metal card body (MCB).

14. The metal transaction card of claim 6, wherein:
the discontinuous metal frame (DMF) has the same overall (outer) size as the metal card body (MCB), as defined by ISO-7816.

15. The metal transaction card of claim 6, wherein:
the discontinuous metal frame (DMF) is electrically insulated from the metal card body (MCB) by coatings on either one or both of the discontinuous metal frame (DMF) and the metal card body (MCB), or by an insulating layer disposed between the discontinuous metal frame (DMF) and the metal card body (MCB), so that the discontinuous metal frame (DMF) does not short out the slit (S, SCF) in the metal card body (MCB).

16. The metal transaction card of claim 6, wherein:
the discontinuous metal frame (DMF) is mounted to a top or bottom surface of the metal card body (MCB).

17. The metal transaction card of claim 16, further comprising:
a recess formed in a surface of the metal card body (MCB) to receive the discontinuous metal frame (DMF) to be flush with a surface of the metal card body (MCB).

* * * * *